April 7, 1970
JEAN-PIERRE SERPETTE
3,504,949
COMBINED SUSPENSION AND BRAKE CORRECTOR
SYSTEM FOR ROAD VEHICLES
Filed Oct. 14, 1968
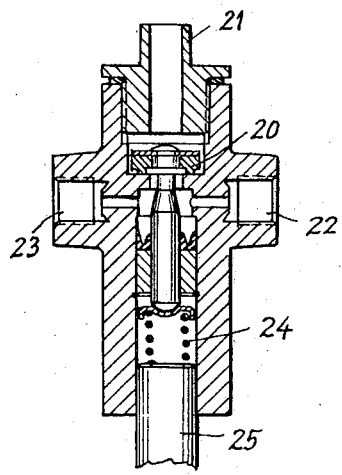
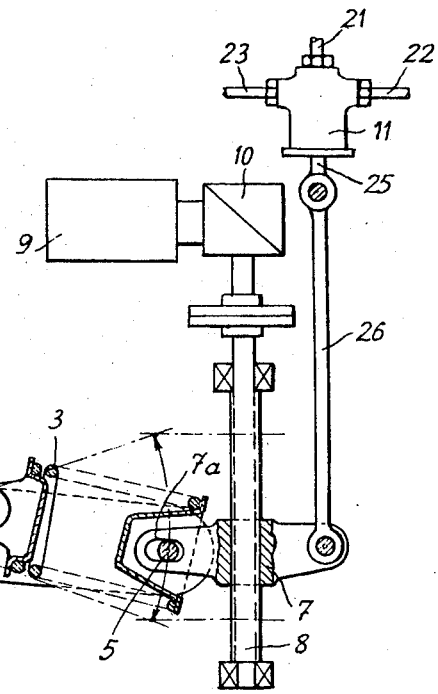
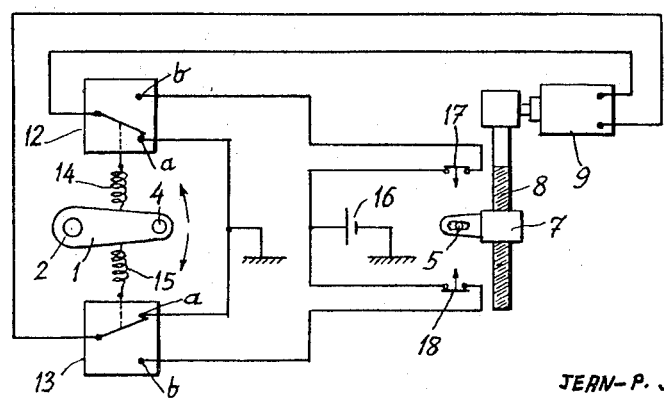
INVENTOR
JEAN-P. SERPETTE
By Stevens, Davis, Miller & Mosher
ATTORNEYS

United States Patent Office 3,504,949
Patented Apr. 7, 1970

3,504,949
COMBINED SUSPENSION AND BRAKE CORRECTOR SYSTEM FOR ROAD VEHICLES
Jean-Pierre Serpette, Billancourt, France, assignor to Regie Nationale des Usines Renault, Billancourt, and Automobiles Peugeot, Paris, France
Filed Oct. 14, 1968, Ser. No. 767,253
Claims priority, application France, Nov. 14, 1967, 128,083
Int. Cl. B60t 8/18
U.S. Cl. 303—22               1 Claim

ABSTRACT OF THE DISCLOSURE

In a road vehicle, in combination, a suspension flexibility corrector and a brake corrector, characterised in that the flexibility corrector comprises a resilient member mounted between two members movable as a function of the load and beats of the suspension. One of the members is responsive to a position-adjusting servomechanism adapted to keep the resilient member in a state of unstable equilibrium in the position of static equilibrium of the suspension. The one element responsive to said position-adjusting servomechanism is also connected to a member for adjusting the brake corrector which is of a type known per se, whereby said brake corrector will also operate according to the load supported by the suspension in the static condition.

---

The present invention relates to a novel combination, in a road vehicle, of a brake corrector with a suspension flexibility corrector.

In a U.S. patent application Ser. No. 728,623, filed on May 13, 1968, by same applicant, a corrector is described which comprises a position adjustment servomechanism for modifying the action of the suspension corrector as a function of the sprung load.

On the other hand it is known to use brake correctors of the type wherein the rear brake circuit is cut off beyond a certain pressure depending on the load, by connecting the rear brake circuit more or less directly to the suspension of a train of wheel in order to act upon a resilient member capable of adjusting the action of the corrector as a function of the load carried by the suspension.

This arrangement is objectionable however in that the operation of the corrector is subordinate to the position of the train of wheels in relation to the vehicle body, which position varies not only with the load but also and more particularly as a function of road unevennesses. Therefore, if a brake application takes place during a suspension beat, the corrector operates at a value definitely not proportional to the actual load for which it should become operative.

This inconvenience is avoided by combining or associating this brake corrector with the flexibility corrector described in the above-mentioned patent application, which combination or association is characterised in that the flexibility corrector comprises a resilient member mounted between two elements movable as a function of the load and of the suspension beats, one of these elements being responsive to a position adjusting servomechanism adapted to keep said resilient member in a state of unstable equilibrium in the position of static equilibrium of the suspension, said one element being also connected to a brake corrector adjustment member of a type known per se, whereby the brake corrector will also operate as a function of the load supported by the suspension in the static condition thereof.

A typical example of this combination of corrector means according to this invention is described hereinafter by way of illustration, with reference to the attached drawing in which:

FIG. 1 is an elevational view of the assembly;
FIG. 2 is a diagrammatic view of the said servomechanism;
FIG. 3 is a detail view of the brake corrector of FIG. 1.

The flexibility corrector is comprised essentially of an arm 1 operatively connected to the suspension system of the vehicle (not shown) so as to oscillate about an axis 2 as a function of the suspension beats, said arm 1 co-acting with a resilient member such as a coil compression spring 3 fitted between two straps pivotally mounted the one by means of a pivot pin 4 to arm 1 and the other by means of another pivot pin 5 carried by a pair of lateral plates or flanges 6 disposed on either side of said spring 3 and fulcrumed on the arm pivot pin 2 secured in turn to the sprung portion of the vehicle (not shown). The type of suspension spring (not shown) and the type of suspension system are immaterial, various exemplary constructions thereof being described and illustrated in the aforesaid patent application.

Reverting to the drawing, it will be seen that the spring 3 tends to move the arm 1 away from its unstable position in which the axes of pivot pins 2, 4 and 5 are mutually aligned. This aligned position is selected to correspond to the static load condition of the vehicle; therefore, the action of coil spring 3 tends to impart the maximum flexibility to the suspension on either side of this position, and subsequently to reduce this flexibility as the arm diverges sufficiently on either side.

To preserve this flexibility control action when the static load is altered, it is therefore necessary to adjust accordingly the mutual alignment of said pivot pins 2, 4 and 5 as a function of said load; in other words, when the vehicle is stationary and irrespective of the load, this alignment must constantly be maintained.

This requirement is met by controlling the position of pivot pin 5 by means of a servomechanism described hereinafter.

The pivot pin 5 carried by said lateral plates or flanges 6 extends through an elongated hole 7a formed in a two-armed nut 7 threadably engaging a substantially vertical screw rod 8 drivingly coupled to an electric motor 9 through the medium of a bevel gear 10, this driving mechanism being mounted in the sprung portion of the vehicle.

As illustrated diagrammatically in FIGURE 2, the electric motor 9 is adapted to be energized for rotation in either direction by means of electric contacts 12, 13 mounted and disposed with a view to detect the misalignment of pivot pins 2, 4 and 5, these contacts being carried for example by one of the lateral plates or flanges 6. The movable contact arms associated with these electric contacts are connected through springs 14 and 15 to said arm 1, respectively. They are electrically connected to the two energizing terminals of motor 9, respectively, so that they can connect same either to the negative terminal of the source of current 16 when said movable contact arms engage contacts a (as obtaining when the arm 1 is in its mean) position or when this arm elongates the corresponding spring, or to the positive terminal when one of the movable contact arms engages contact b (as obtaining when the corresponding spring is compressed by arm 1) the other contact arm being then caused to engage its contact a.

Thus, the electric contacts 12 and 13 permit of energizing the motor 9 with a polarity reversal and therefore of operating the motor in either direction of rotation; however, it will be seen that the motor is started with a certain time-lag so that the nut 7 begins its movement of translation only when an actual change takes place in the static load, but not as a consequence of suspension beats, this time-lag being obtained by using any known time-lag device.

Moreover, the amplitude of the permissible stroke of the servomechanism and therefore of the movement of translation of nut 7 is limited in this arrangement by the provision of limit switches 17 and 18 inserted in the motor energizing circuit and adapted to be actuated by the nut 7 at the end of its strokes corresponding to predetermined maximum and minimum loads of the suspension system.

A brake corrector shown generally at 11 is also operatively connected to this flexibility corrector servomechanism but in such a manner that the brake corrector cannot be influenced by the suspension beats; this brake corrector 11, as shown in FIGURE 3, comprises a known type of valve having a valve member 20 adapted to cut off the brake circuit and disposed between the feed line 21 connected to the source of braking pressure and the lines 22 and 23 connected to the brakes of the rear axle wheels. This corrector comprises, as already known in the art, a resilient member 24 of which the load, adapted to be varied by means of an adjustment member 25, controls the cut-off pressure in the rear brake circuit. By way of illustration, the valve member 20 is shown in its operative condition in FIGURE 3, i.e. in its cut-off position. The aforesaid member 25 is connected to said two-armed nut 7 by means of a linkage such as 26, or any other suitable connecting means (whether flexible, hydraulic, etc.). As a result, the brake corrector is not influenced by the suspension beats, the position of its adjustment member 26 depending only on the position of nut 7, i.e. only on the static load of the vehicle.

I claim:
1. In a road vehicle, in combination, a suspension flexibility corrector and a brake corrector, characterised in that the flexibility corrector comprises a resilient member mounted between two members movable as a function of the load and beats of the suspension, one of said members being responsive to a position-adjusting servomechanism adapted to keep said resilient member in a state of unstable equilibrium in the position of static equilibrium of the suspension, said one element responsive to said position-adjusting servomechanism being also connected to a member for adjusting the brake corrector whereby said brake corrector will also operate according to the load supported by the suspension in the static condition.

References Cited
UNITED STATES PATENTS 3,410,611    11/1968    Turnbull _____ 303—22

MILTON BUCHLER, Primary Examiner

J. J. McLAUGHLIN, Jr., Assistant Examiner

U.S. Cl. X.R.
280—6